1,809,365

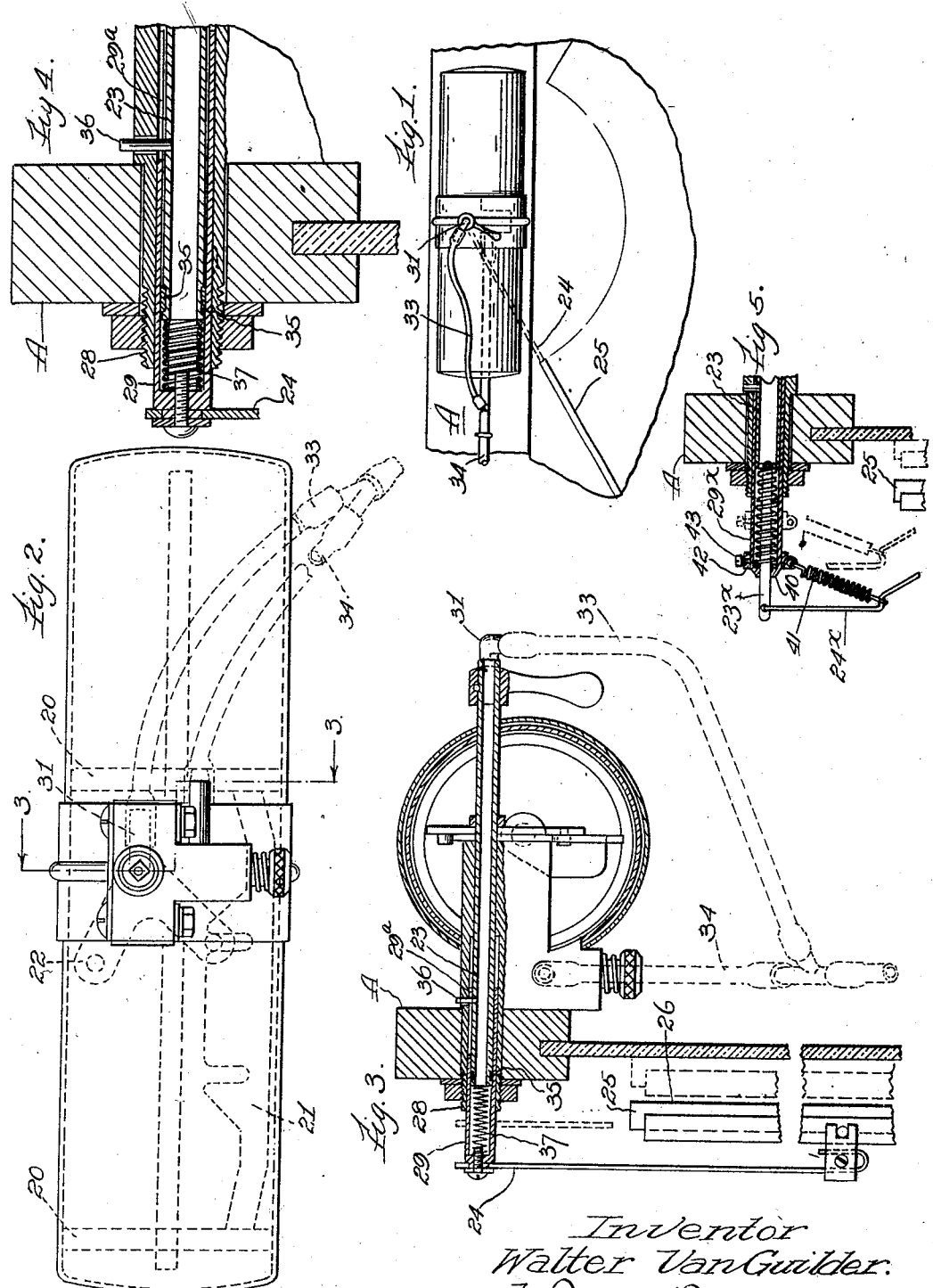
June 9, 1931. W. VAN GUILDER 1,809,365
WINDSHIELD CLEANER
Filed Dec. 3, 1928
Inventor
Walter Van Guilder
by Burton & Burton
his Attorneys Patented June 9, 1931

UNITED STATES PATENT OFFICE

WALTER VAN GUILDER, OF CHICAGO, ILLINOIS, ASSIGNOR TO STEWART-WARNER CORPORATION, OF CHICAGO, ILLINOIS, A CORPORATION OF VIRGINIA

WINDSHIELD CLEANER

Application filed December 3, 1928. Serial No. 323,334.

The purpose of this invention is to provide an improved construction in a windshield wiper of a type which is operated by the alternation of suction and atmospheric pressure, the specific object of the improvement being to utilize the suction by which the wiper-actuating mechanism is operated for pressing the wiper in wiping contact with the windshield, so that the pressure for such contact will be relieved proportionately to the reduction of the suction by which the operating mechanism is actuated. It consists in the elements and features of construction shown and described as indicated in the claims.

In the drawings:—

Figure 1 is a rear view of a device embodying the invention.

Figure 2 is a front view of the same with certain parts omitted.

Figure 3 is a detail section at the line 3—3 on Figure 2.

Figure 4 is a fragmentary enlarged section similar to Figure 3 in operative position.

Figure 5 is a detail section similar to Figure 3 showing a modification.

It is a frequent occurrence in the operation of windshield wipers of the type in which the wiper is vibrated over the windshield glass by mechanism which is operated by the engine suction, that when the engine suction is low, causing the wiper-operating mechanism to be weakly actuated, the friction of the wiper on the glass cannot be overcome by he actuating mechanism, and the wiper accordingly ceases to operate.

The present invention is designed to overcome this defect in this type of windshield wipers by relieving the pressure of the wiper on the glass correspondingly to the reduction of the suction by which the mechanism is actuated. The preferred expedient for obtaining this result consists in utilizing the suction as substantially the sole means of pressing the wiper against the glass, so that the pressure will be at all times proportionate to the suction and will consequently by substantially zero when the suction is cut off.

The drawings may be understood as showing a conventional type of windshield wiper having its supporting structure mounted on the upper frame bar, A, of the windshield, the details of the operating mechanism being only conventionally and partly shown, but comprising a reciprocating member indicated by the piston, 20, which is connected in any suitable manner—suggested by a rack bar, 21, engaging a pinion, 22,—for operating a rock shaft, 23, which protrudes from the supporting structure, and at the forwardly protruding end in front of the windshield, carries a lever arm, 24, to whose free end there is connected the wiper, 25, having the customary flexible lip, 26, for pressing upon and moving over the windshield in the wiping operation, said wiper being suitably connected to the lever arm to enable it to accommodate the wiping lip to the plane of the windshield surface to be wiped.

For the purpose of the present invention, the rock shaft, 23, is tubular, being open at the forward end which protrudes from the bearing of the rock shaft in the supporting structure, shown at 28, and at the opposite end of the rock shaft, where it protrudes rearwardly from the supporting structure behind the windshield frame bar, A, its tubular cavity is connected with the source of suction by which the rock shaft operating mechanism is operated, said connection being indicated by a tubular terminal, 31, which is fitted snugly in the tubular cavity of the rock shaft, 23, and at its other end is connected by a flexible tube, 33, with the tube, 34, through which the operating mechanism derives suction from the source of suction.

At the forward protruding end of the rock shaft, it is telescoped within a sleeve cap member, 29, whose forward end is closed; and said sleeve cap, telescoped outside of the tubular rock shaft, is rendered fluid-tight by the telescoping bearings by a suitable packing, indicated at 35. It will be understood that by making the outer telescoped member, 29, closed at its forward end, and suitably packing the slide bearings of the two telescoping members upon each other, the cavity to which the suction is given access through the connection described, becomes a vacuum chamber, so that exterior atmospheric pressure tends to telescope the cap sleeve, 29, onto the tubular rock shaft for reducing the capacity of this vacuum chamber. For holding the outer telescoping cap sleeve, 29, normally extended, there is provided a coil spring, 37, located within the axial cavity of the tubular rock shaft, stopped at its rear end by any convenient means, as the end of the tube, 31, which may be utilized for this purpose, said spring being stopped at the opposite end on the closed end of the cap, so that the spring reacts for holding the sleeve extended to the position shown in Figure 2. And the forward protrusion of the rock shaft and outer telescoping cap sleeve, 29, is made sufficient to cause the lever arm, 24, carried at the forward end of the cap sleeve, to hold the wiper, 25, withdrawn forwardly from the windshield at the normal position of the parts under the normal reaction of the spring, 35. But it will be seen that when the structure is connected with a source of suction for operating the rock-shaft-actuating mechanism, the suction obtaining access to the cavity of the tubular rock shaft and outer telescoped cap sleeve, 29, producing a condition of partial vacuum in the vacuum chamber described, the cap sleeve, 29, will be forced by atmospheric pressure rearwardly against the reaction of the spring, 35, bringing the wiper, 25, into operative contact with the windshield for the wiping action which will be simultaneously caused by the operation of the vacuum-operated mechanism for rocking the rock shaft.

Certain preferential details of the construction may require mention. While the tube, 31, is intended to be snugly fitted in the tubular rock shaft, it should not be so tightly fitted as to present its ready removal, and accordingly, for holding it safely in operative position in the tubular rock shaft, and in position for constituting the stop for the inner end of the spring, 35, there is provided a retaining pin, 36, which is set in through the wall of the tubular rock shaft for engaging the tube, 31, near the end of the latter. This pin is also utilized for guiding the outer telescoping cap sleeve, 29, in its telescopic movement along the rock shaft and for checking the forward movement of said cap sleeve under the reaction of the spring, 35, this function being obtained from said pin by causing it to extend through and engage a longitudinal slot, 29ª, in the sleeve, 29, the length of said slot being made to correspond to the telescoping movement of the sleeve, 29, under the operation of the suction and reaction of the spring, 35.

In the modification shown in Figure 5, the lever arm, 24ˣ, is hingedly secured to a stud, 23ˣ, which is extended forwardly from the rock shaft, 23, and protrudes out through a stuffing box formed by a leather washer, 40, in the head of the cap sleeve, 29ˣ; and the wiper, 25, is arranged to be brought against the windshield glass by a rearward pivotal swinging movement of the lever arm instead of by its bodily movement as in the first described form. This rearward swinging movement is transmitted to the lever arm from the rearward movement of the telescoped cap sleeve through the medium of a stretched spring, 41, secured at one end to the telescoped sleeve and at the other end to the lever arm at a short distance from its hinged end. Preferably, for adjusting the tension of the spring, its securement to the cap sleeve is made by a collar, 42, mounted slidably on the outside of the cap sleeve, the spring being attached to the collar, and a set screw, 43, being provided for securing the collar at adjusted position along the length of the sleeve.

I claim:—

1. In a windshield wiper arranged to be operated by engine suction for giving the wiper its wiping movement over the windshield, a wiper mounted for being withdrawably pressed against the windshield; suction-operated means for pressing the wiper against the windshield consisting of two parts, one of which is telescoped within the other, the inner-telescoping one of said parts being tubular and having the connection with the suction conduit; whereby its cavity becomes a vacuum chamber, the outer telescoping part being that upon which the wiping member is mounted, and by its telescoping movement due to suction operating for pressing the wiper against the windshield.

2. In a windshield wiper arranged to be operated by engine suction for giving the wiper its wiping movement over the windshield, a wiper mounted for being withdrawably pressed against the windshield; suction-operated means for pressing the wiper against the windshield comprising two telescoping tubular parts with the cavity of the inner of which the connection from the suction conduit is made, one of said telescoping parts constituting the mount for carrying the wiper member.

3. In a construction for the purpose indicated, an operating mechanism arranged to be operated by suction and comprising a conduit leading from a source of suction; a rock shaft connected for deriving its rocking movement from said mechanism, said rock shaft consisting of two members, at least one of which is tubular, said members being formed and assembled for relative sliding of one within the other and enclosing a chamber which is enlarged and reduced by said relative sliding movement, one of said members being provided with means for connecting said chamber with the conduit leading to the suction-actuated mechanism, a lever arm carried by the sliding rock shaft member and a wiper carried by said lever arm.

4. In a device for the purpose indicated in combination with a rock shaft, a support in which it is journaled for rocking movement, and means for rocking it; a telescoping member at one end of the rock shaft, a lever arm carried by said telescoping member, and a wiper at the free end of the lever arm, a spring reacting longitudinally of the rock shaft between the same and the telescoping member for stressing the latter limitedly outwardly along the shaft, the shaft being hollow and the telescoping member being adapted to close the cavity of the shaft at the end at which said member is telescoped with the shaft, whereby said cavity constitutes a vacuum chamber; means connecting said vacuum chamber with the source of suction; suction-operated means for rocking the shaft, said means being connected for operation with the same source of suction as the vacuum chamber.

5. In the construction defined in claim 3, the lever-carrying element being telescoped outside the hollow rock shaft, whereby its cavity constitutes part of the vacuum chamber, and being closed at the outer end for completing the enclosure of the vacuum chamber.

6. In a construction for the purpose indicated, an operating mechanism arranged to be operated by suction and comprising a conduit leading from a source of suction; a two-part rockingly mounted element connected for deriving rocking movement of both its parts from said mechanism, said element comprising a hollow member having its cavity connected with a source of suction, and a part substantially closing the end of said hollow member movable longitudinally of said hollow member responsively to the suction; a spring reacting on said part in opposition to the suction; a lever arm carried by said suction-and-spring-actuated part, and a wiper carried by said lever arm.

7. In the construction defined in claim 6, the lever-arm-carrying telescoping member being telescoped outside the hollow member, the spring reacting between said telescoping members and being located interiorly of both said members.

8. The construction defined in claim 6, the longitudinally movable part of the rocking element being telescoped outside the other part thereof and having a closed end, said other part having an extension protruding through said closed end, and the lever arm being pivotally connected to the protruding end of said extension, and a spring reacting between the lever arm and the rocking element for stressing the lever arm toward the windshield.

9. The construction defined in claim 6, the longitudinally movable part of the rocking element being telescoped outside the other part and having a closed end, said other part having an extension protruding through said closed end, the lever arm being pivotally connected to the protruding end of said extension, a collar adjustable longitudinally of the rocking element, and a spring stretched for reacting between the collar and the lever arm for stressing the lever and the wiper carried thereby toward the windshield.

10. A windshield wiper comprising a supporting structure arranged for mounting on the windshield frame; a rock shaft journaled in said supporting structure and protruding forwardly, comprising members including a telescoping member at the protruding end of the rock shaft; a wiper arm carried by one of said rock shaft members and operatively connected with the telescoping member for movement thereby toward and from the windshield, and a wiper carried at the free end of said arm; suction-operated means for rocking the rock shaft, said rock shaft being hollow, its cavity at the protruding end being closed by its telescoping member; connections from the same source of suction to the rock shaft operating means and to the rock shaft cavity; a spring reacting on the telescoping member for holding the same normally projected forwardly, the rock shaft and the telescoping member having their mutual bearings for telescoping fitted to each other for piston-wise operation upon access of suction to the rock shaft cavity: and means for simultaneously controlling the access of suction to the rock-shaft-actuating mechanism and to the rock shaft cavity; whereby when the rock shaft is actuated for its rocking movement the wiper at the free end of the wiper-carrying arm is pressed toward the windshield, and is withdrawn therefrom when the rock-shaft-operating mechanism is stopped by the interruption of the suction.

In testimony whereof, I have hereunto set my hand at Chicago, Illinois, this 30th day of November, 1928.

WALTER VAN GUILDER.